United States Patent [19]

Kuroda et al.

[11] Patent Number: 5,731,594

[45] Date of Patent: Mar. 24, 1998

[54] INFRARED LIGHT SOURCE

[75] Inventors: Shin-ichi Kuroda, Ibaraki; Hideki Sato, Kyoto; Yasuo Tsukuda, Mishima-gun, all of Japan

[73] Assignee: Shimadzu Corporation, Kyoto, Japan

[21] Appl. No.: 699,785

[22] Filed: Aug. 20, 1996

[30]  Foreign Application Priority Data

Aug. 31, 1995  [JP]  Japan ................... 7-248553

[51] Int. Cl.$^6$ ....................................... G01J 3/10
[52] U.S. Cl. ................. 250/504 R; 219/553; 392/439
[58] Field of Search ................. 250/504 R; 219/553; 392/439

[56]  References Cited

U.S. PATENT DOCUMENTS

| | | | |
|---|---|---|---|
| 2,432,484 | 12/1947 | Moulton | 88/1 |
| 4,804,823 | 2/1989 | Okuda et al. | 219/553 |
| 5,077,461 | 12/1991 | Hasegawa | 219/553 |
| 5,264,681 | 11/1993 | Nozaki et al. | 219/553 |
| 5,402,038 | 3/1995 | Parham et al. | 313/623 |

FOREIGN PATENT DOCUMENTS

| | | |
|---|---|---|
| 0 177 724 | 4/1986 | European Pat. Off. . |
| 0 689 229 | 12/1995 | European Pat. Off. . |
| 4204288 | 8/1992 | Germany . |
| 2179530 | 3/1987 | United Kingdom . |

*Primary Examiner*—Jack I. Berman
*Attorney, Agent, or Firm*—Oliff & Berridge, PLC

[57]  ABSTRACT

An infrared light source used in spectrometers including an infrared range, a Fourier Transform Infrared Spectroscope (FTIR), etc. The infrared light source is composed of a panel made of sintered silicon nitride plates, a heating element made of metal and embedded in the panel, and a pair of conducting lines for supplying electricity to the heating element. The infrared light is emitted homogeneously from the flat surface of the panel, as compared to a conventional infrared light source using a metal filament in which infrared light is emitted inhomogeneously. It is preferred to form a silicon oxide layer on a surface of the panel to prevent initial change in the infrared emitting characteristic.

5 Claims, 4 Drawing Sheets

INFRARED LIGHT SOURCE

The present invention relates to a light source that generates infrared light which can be used in spectrometers including an infrared range, a Fourier Transform Infrared Spectroscope (FTIR), etc.

BACKGROUND OF THE INVENTION

Conventional infrared light sources use a coiled metal (usually Kanthal) filament. But an incandescent coiled filament does not emit light homogeneously, whereby the energy intensity as a whole is low and consequently the total power of the light source is small. If a slit of the spectrometer is placed at the focal point of a mirror that converges the light from the light source, a clear image of the filament coil is formed on the slit. Thus the slit is usually placed slightly off-focus to reduce the influence of the inhomogeneousness of the emission, which deteriorates the energy efficiency of the light source. Another drawback of the coiled filament is that the shape of the coil tends to deform gradually while it is used, which leads to a further decrease in the emission intensity and a shortened life.

SUMMARY OF THE INVENTION

The present invention addresses the above problems and provides a new infrared light source that has greater emission power, improved emission homogeneousness and a longer life.

An infrared light source according to the present invention is characterized by comprising a panel made of sintered silicon nitride ($Si_3N_4$) and having a flat surface, and a heating element made of metal and embedded in the panel.

In one feature of the present invention, a pair of conducting lines are also embedded in the panel for supplying an electric current to the heating element to generate a joule heat. In this case, the heating element is one-dimensional, and a longer heating element should be embedded in the panel. In one example, the heating element is folded in a shape of a comb.

In another feature of the present invention, the heating element is heated by an induction heating apparatus placed outside of the panel. In this case, the heating element is two-dimensional.

When the heating element is heated, by an electric current or by induction, in the panel, the heat is transmitted to the panel which emits an infrared light homogeneously from its flat surface. Since the infrared light is emitted homogeneously from the flat surface, the image of the infrared light source can be just focused on the slit of a spectrometer or similar aperture using devices. This provides stronger infrared light to the analyzing section which leads to an improved infrared analysis with a higher S/N (signal-to-noise) ratio.

Silicon nitride is stable chemically and mechanically even at high temperatures up to about 1350° C. That is, the silicon nitride plate of the infrared light source of the present invention does not decompose or deform up to that temperature. Thus the heating element can be heated to such a high temperature, and a larger luminance can be obtained by using the infrared light source of the present invention.

Silicon nitride is black. Thus the surface of the panel has high emissivity, which means a high energy efficiency of the infrared light source of the present invention.

It is preferred to form a silicon oxide layer on the flat surface of the panel before it is used. If no silicon oxide layer is present on the surface of the panel at the beginning, silicon oxide accumulates on the surface when the panel is heated during its use, which causes change in the spectrum of the radiation emitted from the surface. When the silicon oxide layer exists on the flat surface from the beginning, on the other hand, the silicon nitride panel emits radiation of a stabilized spectrum even at the early stages of its use.

One way of forming a silicon oxide layer is to apply a silicate solution to the surface of the silicon nitride panel and bake it. It is preferred to age the silicon nitride panel after baking by energizing the panel to stabilize the silicon oxide layer.

Other features and further details of the present invention are given in the description of a preferred embodiment that follows.

DETAILED DESCRIPTION OF A PREFERRED EMBODIMENT

Figure 1:
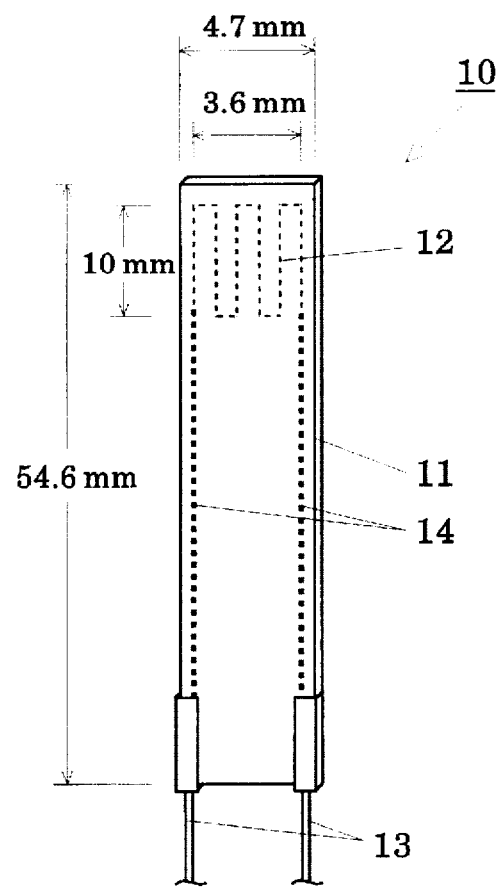
FIG. 1 is a perspective view of an infrared light source as an embodiment of the present invention.
Figure 2:
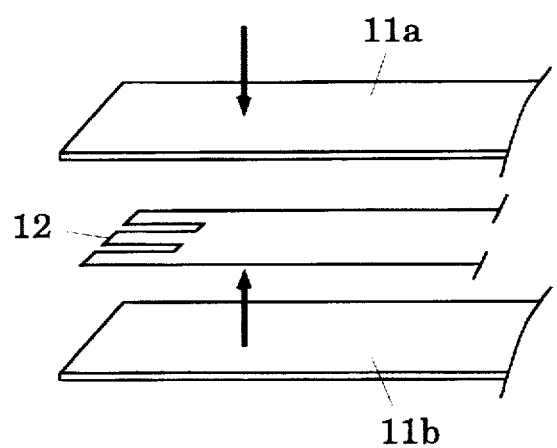
FIG. 2 is a structural illustration of the infrared light source of FIG. 1.

An infrared light source is illustrated in FIGS. 1 and 2 as an embodiment of the present invention, in which the light source 10 is made of a panel 11, a heater 12, a pair of lead pins 13 and a pair of lead lines 14. The heater 12 is made of a high-melting-point metal such as tungsten or molybdenum or their alloy. The panel 11 is made of a pair of silicon nitride plates 11a and 11b, where the heater 12 and the lead lines 14 are placed between the silicon nitride plates 11a and 11b.

The infrared light source 10 of the present embodiment is produced as follows. First, a pair of green silicon nitride plates 11a and 11b are prepared. On one of the green silicon nitride plates 11a is printed the heater metal, and the lead lines 14 and lead pins 13 are placed thereon. The heater 12 is formed one-dimensionally between the lead lines 14 and printed in a small area at an end of the silicon nitride plates 11a and 11b. In the case of FIG. 1, for example, the heater is placed in a 3.6×10 mm area at an end of the silicon nitride plates of 4.7×54.6 mm. In order to generate greater heat output, the linear heater 12 is contoured like a comb.

After the heater 12, lead lines 14 and the lead pins 13 are sandwiched by the pair of green silicon nitride plates 11a and 11b, they are sintered. There are various ways to sinter a silicon nitride plate. One is a hot press method in which the sandwiched green plates 11a and 11b are heated in a nitrogen ($N_2$) atmosphere of about 235 kg/cm² at about 1850° C. for about 0.5–2 hours. Another is a normal pressure method in which the green plates 11a and 11b are heated in a nitrogen atmosphere of normal pressure (1 atm) at about 1650° C. for about 4 hours. Combination of the two methods are possible, and other sintering methods can also be used in the present invention. After the green plates 11a and 11b are sintered, the heater 12 is completely sealed in the panel 11.

In using the infrared light source 10, an electric current is supplied from the lead pins 13 through the lead lines 14 to the heater 12, which generates the Joule heat. The heat is transmitted to the panel 11, whereupon the panel 11 emits infrared light from the surface areas under which the heater 12 is embedded. Since the surface of the panel 11 is formed flat and the surface of the panel is almost homogeneously heated, the infrared light is emitted almost homogeneously from the surface.

Figure 3:
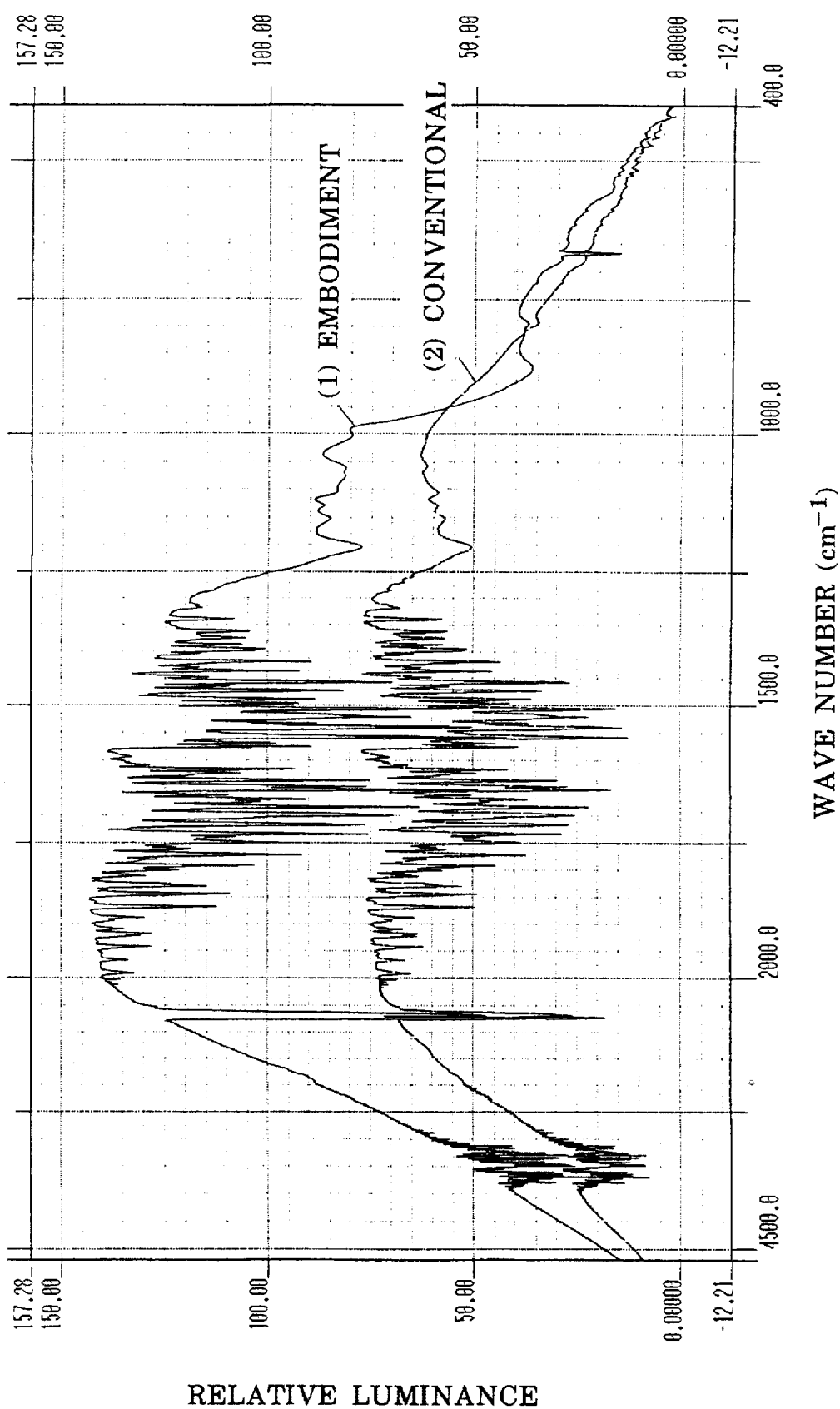
FIG. 3 is a graph of power spectra of the infrared light emitted from an infrared light source of an embodiment of the present invention (1) and a conventional infrared light source using a Kanthal filament (2).

FIG. 3 is a graph of power spectra of the infrared light emitted from the infrared light source 10 of the present embodiment as compared to a conventional infrared light source using a Kanthal filament. The temperature of the heater 12 of the present embodiment is set at 1200° C. while that of the conventional heater is set at 1100° C. As shown in FIG. 3, the luminance of the infrared light source 10 of the present embodiment emits far stronger infrared light than the conventional one. The greater luminance and the homogeneousness at the emitting surface provide stronger infrared light through the slit of spectrometers, which enable various infrared analysis at high S/N ratio.

After a duration test, the life of the infrared light source 10 of the present embodiment is found to be more than 5000 hours when the heater 12 is used at 1200° C. This is far longer than the life of normal Kanthal filaments of conventional infrared light sources which is about 2000 hours when used at 1200° C.

If an infrared light source using silicon nitride is initially unoxidized, an oxide layer is gradually formed on the surface of the silicon nitride when it is heated at such a high temperature. Since the forming speed of the oxide layer is so slow, it takes a rather long time until a stable oxide layer is established on the surface of the silicon nitride panel 11. In the meantime, accordingly, the spectrum of the infrared light emitted from the panel 11 is unstable. It is therefore preferable to treat the panel 11 beforehand to form a thin layer of stable silicon oxide on its surface.

One of the easiest ways of forming such a stable silicon oxide layer is to apply a solution of silicate, sodium silicate for example, on the surfaces of the sintered panel 11 and then bake it. When the sodium silicate is used, the baking condition is to heat it at about 400° C. for about one hour in the normal atmosphere. This treatment makes a quite stable silicon oxide layer on the panel 11 of the infrared light source 10. The thickness of the oxide layer is preferred to be about 3-20 micrometers, but preferably more than 10 micrometers.

Figure 4:
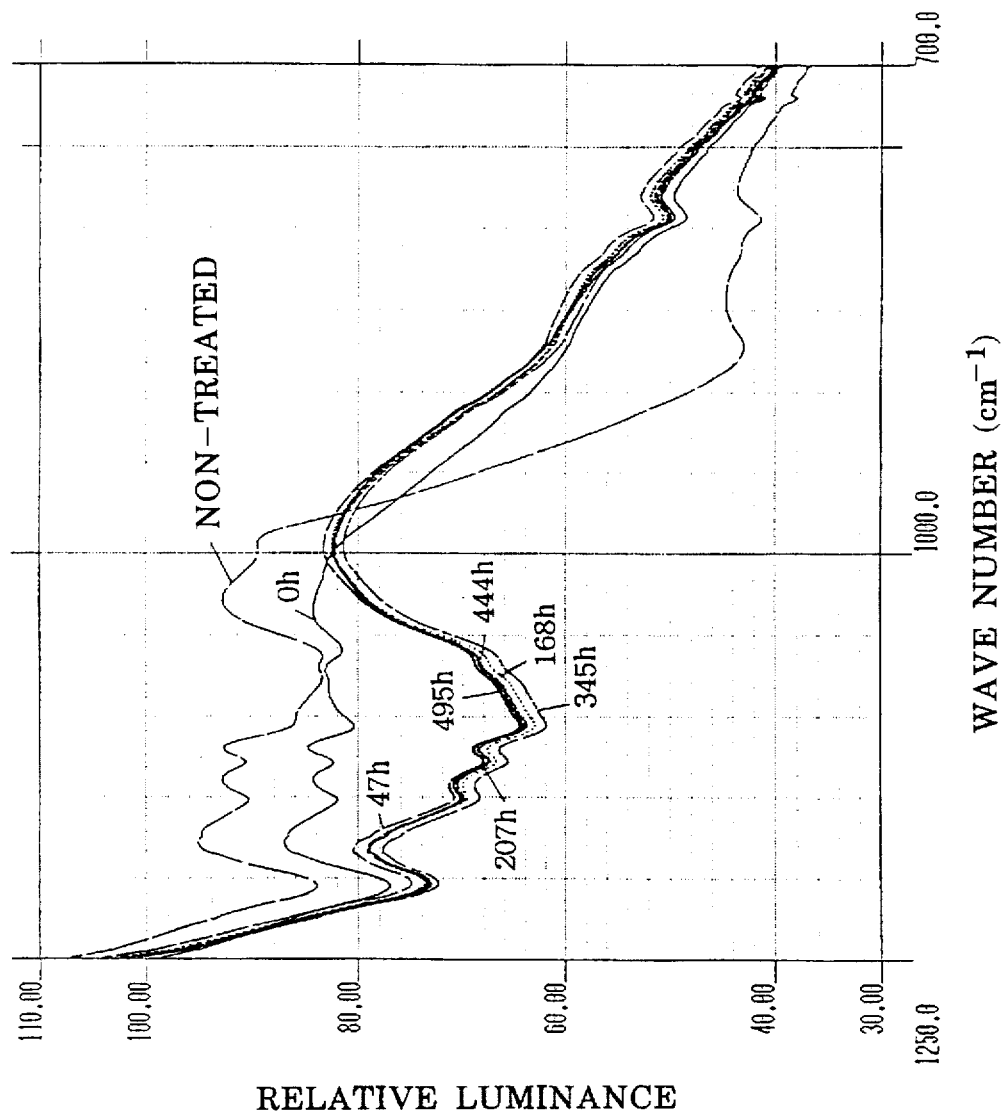
FIG. 4 is a graph of power spectra of the infrared light emitted from a surface treated panel.
Figure 5:
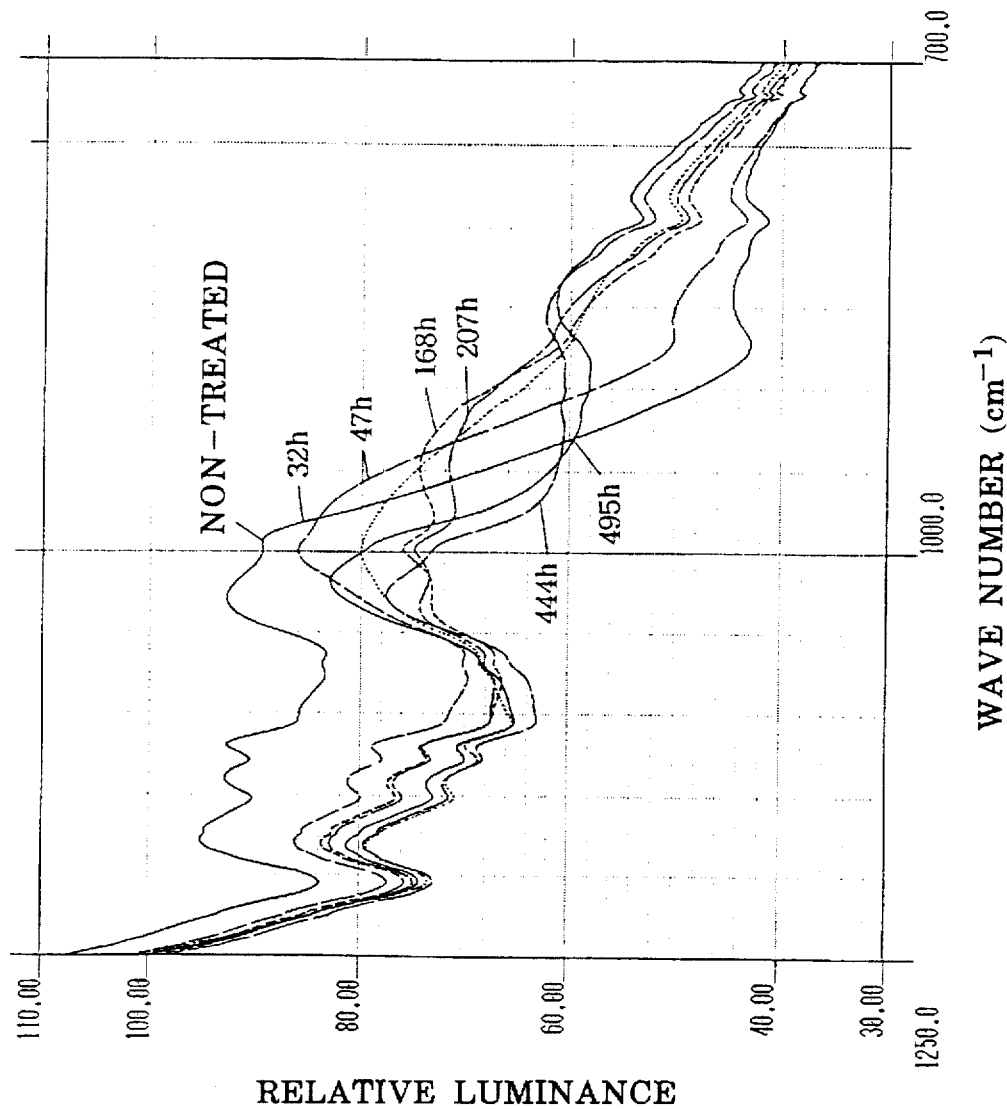
FIG. 5 is a graph of power spectra of the infrared light emitted from a non-treated panel.

Comparison of FIGS. 4 and 5 shows the effects of the surface treatment. FIG. 4 is a graph of power spectra of infrared light emitted from a surface treated panel, and FIG. 5 is of a non-treated panel, where an initial spectrum of a non-treated panel is presented for the convenience of comparison. The spectra are obtained at various hourly intervals after the infrared light source is first turned on. It is seen in FIG. 5 that a considerable change occurs at an absorption band of silicon nitride centering around 850–900 cm$^{-1}$ in the wave number in the case of non-treated panel, while the spectra are stable in the case of surface treated panel as in FIG. 4.

In the case of the surface treated panel, as seen in FIG. 4, a decrease in the relative luminance due to an absorption band of silicon oxide centering around 1050–1100 cm$^{-1}$ clearly appears after the panel is energized for about one day, but the spectrum becomes stable thereafter. This is because the oxide layer on the surface of the panel 11 becomes complete in the sense that it does not let oxygen pass after it is aged for about a day even though initially it has pinholes or an irregular thickness. In the case of a non-treated panel, as seen in FIG. 5, the spectra emitted are still unstable mainly at the absorption bands of silicon nitride and silicon oxide after it is energized for 500 hours. The comparison shows that the surface treatment to the panel 11 renders a stable power spectrum of infrared light source from the beginning of its use.

What is claimed is:

1. An infrared light source comprising:

a panel made of sintered silicon nitride and having a flat surface for emitting infrared light, wherein a silicon oxide layer of a stable thickness between 3 and 20 micrometers is formed on the flat surface of the panel;

a heating element made of metal and embedded under the flat surface of the panel; and a pair of conducting lines for supplying an electrical current to the heating element.

2. The infrared light source according to claim 1, wherein the heating element is made of a metal line contoured in a shape of a comb.

3. A method of producing an infrared light source comprising the steps of:

forming a composite by placing a heating element made of metal and a pair of conducting lines between a pair of green silicon nitride plates;

sintering the composite to produce a panel of the infrared light source;

forming a silicon layer of a stable thickness between 3 and 20 micrometers by applying a silicate solution on a flat surface of the panel after being sintered;

drying the silicate solution by baking the panel; and aging the silicon oxide layer on the flat surface by energizing the panel.

4. The method of producing an infrared light source according to claim 3, wherein a silicate solution is a solution of sodium silicate.

5. The method of producing an infrared light source according to claim 4, wherein the method further comprises the step of aging the silicon oxide layer on the flat surface by energizing the panel.

* * * * *